United States Patent
Diep et al.

(10) Patent No.: US 12,404,003 B2
(45) Date of Patent: Sep. 2, 2025

(54) CFRP FUSELAGE FRAME WITH SECUREMENT TO VERTICAL TAIL FIN

(71) Applicant: THE BOEING COMPANY, Chicago, IL (US)

(72) Inventors: Paul Diep, Bothell, WA (US); Phiyen T. Pham, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 545 days.

(21) Appl. No.: 17/360,356

(22) Filed: Jun. 28, 2021

(65) Prior Publication Data

US 2022/0048610 A1   Feb. 17, 2022

Related U.S. Application Data

(60) Provisional application No. 63/064,711, filed on Aug. 12, 2020.

(51) Int. Cl.
| | |
|---|---|
| *B64C 1/26* | (2006.01) |
| *B64C 1/00* | (2006.01) |
| *B64C 1/06* | (2006.01) |
| *B64F 5/10* | (2017.01) |

(52) U.S. Cl.
CPC ............ *B64C 1/26* (2013.01); *B64F 5/10* (2017.01); *B64C 2001/0072* (2013.01); *B64C 1/061* (2013.01)

(58) Field of Classification Search
CPC ..... B64C 1/26; B64C 5/06; B64C 2001/0072; B32B 2605/18
See application file for complete search history.

(56) References Cited

U.S. PATENT DOCUMENTS

| | | | |
|---|---|---|---|
| 8,348,196 B2 | 1/2013 | Campana | |
| 9,776,704 B1* | 10/2017 | Rufino | ............... B29C 70/384 |
| 10,046,848 B2 | 8/2018 | Folch Cortes et al. | |
| 2010/0155532 A1 | 6/2010 | Ariza Martin et al. | |

(Continued)

FOREIGN PATENT DOCUMENTS

| | | |
|---|---|---|
| CN | 109720544 A | 5/2019 |
| EP | 2444315 A2 | 4/2012 |

(Continued)

OTHER PUBLICATIONS https://www.researchgate.net/figure/Airbus-A300-600-vertical-stabilizer-construction_fig1_279693318, Jan. 2006.

(Continued)

*Primary Examiner* — Joshua J Michener
*Assistant Examiner* — Ashesh Dangol
(74) *Attorney, Agent, or Firm* — Joseph M. Butscher; The Small Patent Law Group LLC

(57) ABSTRACT

A securement assembly for securing a vertical tail fin assembly to an aircraft includes a first lug member secured to the vertical tail fin assembly. The securement assembly further includes a first clevis member. The first clevis member includes a first end portion of the first clevis member is engaged to the first lug member. A second end portion of the first clevis member is secured to a first fuselage frame constructed of a composite material with a first fastener which extends through the second end portion and the first fuselage frame in a first direction transverse to the first fuselage frame.

20 Claims, 9 Drawing Sheets

(56) References Cited

U.S. PATENT DOCUMENTS

| | | |
|---|---|---|
| 2010/0264271 A1 | 10/2010 | Cortes et al. |
| 2011/0089292 A1* | 4/2011 | Williams ................. B64C 1/26 29/525.01 |
| 2012/0091275 A1* | 4/2012 | Vera Villares ............ B64C 1/26 244/131 |
| 2015/0034765 A1* | 2/2015 | Gonzalez Gozalbo ... B64C 9/00 244/120 |
| 2020/0023934 A1* | 1/2020 | Martino-Gonzalez .... B64C 5/02 |
| 2020/0156758 A1* | 5/2020 | Colmenarejo Matellano .............. B64C 5/06 |
| 2021/0371080 A1* | 12/2021 | Campana ................. B64C 7/00 |

FOREIGN PATENT DOCUMENTS

| | | |
|---|---|---|
| EP | 3078586 A1 | 10/2016 |
| EP | 3584152 A1 | 12/2019 |
| EP | 3653490 A1 | 5/2020 |
| JP | 2018-8679 | 1/2018 |

OTHER PUBLICATIONS

Communication Pursuant to Rule 62 EPC for EP Application No. 21169331.2 dated Oct. 14, 2021.
Extended European Search Report for EP Application No. 21183492.4 dated Jan. 18, 2022.
English version of JP 2018-8679.

* cited by examiner

CFRP FUSELAGE FRAME WITH SECUREMENT TO VERTICAL TAIL FIN

CROSS-REFERENCE TO RELATED APPLICATIONS

This application claims priority to U.S. Provisional Patent Application No. 63/064,711, entitled "CFRP FUSELAGE FRAME WITH SECUREMENT TO VERTICAL TAIL FIN" and filed Aug. 12, 2020, the entire disclosure of which is hereby incorporated by reference herein.

FIELD

This disclosure relates to securement of a vertical fin assembly of an aerospace vehicle to the aerospace vehicle and more particularly, to securement of the vertical fin assembly to a fuselage frame of an aircraft.

BACKGROUND

There is a concern with respect to the occurrence of corrosion of an aluminum fuselage frame with an aluminum frame being attached to a composite fiber reinforced polymer ("CFRP") skin of an aircraft. In addition, with constructing an aircraft with utilizing, for example, an aluminum frame with a CFRP skin, fatigue issues arise due to the material differences and their different thermal expansion effects. Aluminum, for example, has a thermal expansion co-efficient greater than that of the CFRP. Aluminum experiences contraction in cold conditions and expands in hot conditions relative to the CFRP material which in comparison is thermally neutral. As a result of using different materials for the frame and skin structures, these structures experience compression and tension forces with the aircraft experiencing differing temperatures in operation of the aircraft. Moreover, with respect to production, metallic frames, such as aluminum fuselage frames, require de-burring after drilling to prevent fatigue cracking; require fay surface sealing prior to installation to prevent corrosion; and impose expanded time demands in production.

As a result, there is a need to reduce costs in aircraft production associated with corrosion protection measures being taken with use of different materials such as aluminum for frames and CFRP for skin of the aircraft and to reduce thermal fatigue as a result of thermal expansion effects on interconnected structures in the aircraft which are constructed of different materials each having a different thermal expansion co-efficient. Also, there is a need to shorten production time with respect to the time imparted to production with use of metallic frames.

SUMMARY

An example includes a securement assembly for securing a vertical fin assembly to an aircraft includes a first lug member secured to the vertical fin assembly. The securement assembly includes a first clevis member. A first end portion of the first clevis member is engaged to the first lug member. A second end portion of the first clevis member is secured to a first fuselage frame constructed of a composite material, with a first fastener which extends through the second end portion and the first fuselage frame in a first direction transverse to the first fuselage frame.

An example includes a method for securing a vertical fin assembly to an aircraft, which includes securing a first lug member, which is secured to the vertical fin assembly, to a first end portion of a first clevis member. The method further includes securing a second end portion of the first clevis member to a first fuselage frame constructed of a composite material, with a first fastener which extends through the second end portion of the first clevis member and the first fuselage frame in a first direction transverse to the first fuselage frame.

The features, functions, and advantages that have been discussed can be achieved independently in various embodiments or may be combined in yet other embodiments further details of which can be seen with reference to the following description and drawings.

DESCRIPTION

Figure 1:
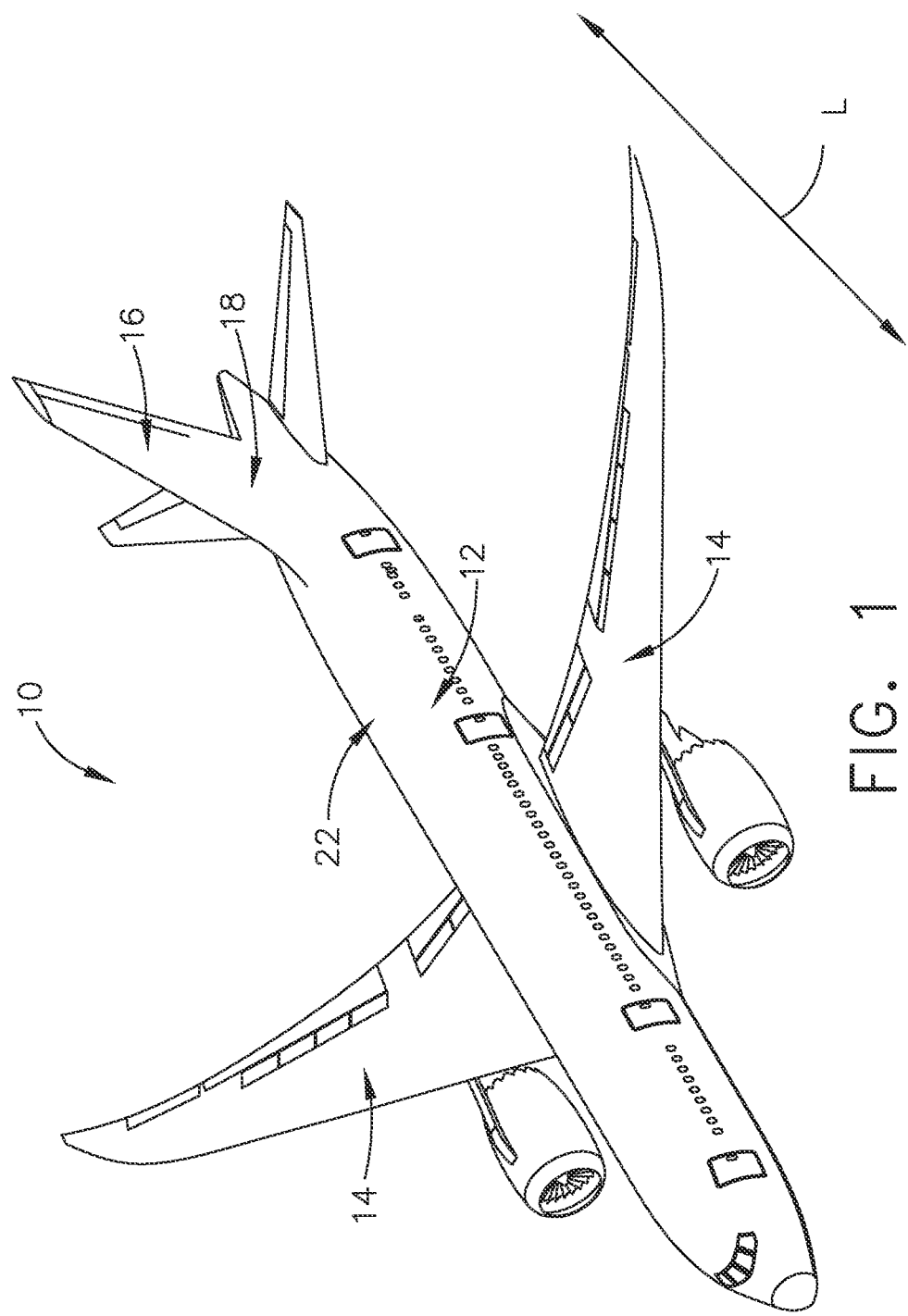
FIG. 1 is a perspective view of an aircraft.
Figure 2:
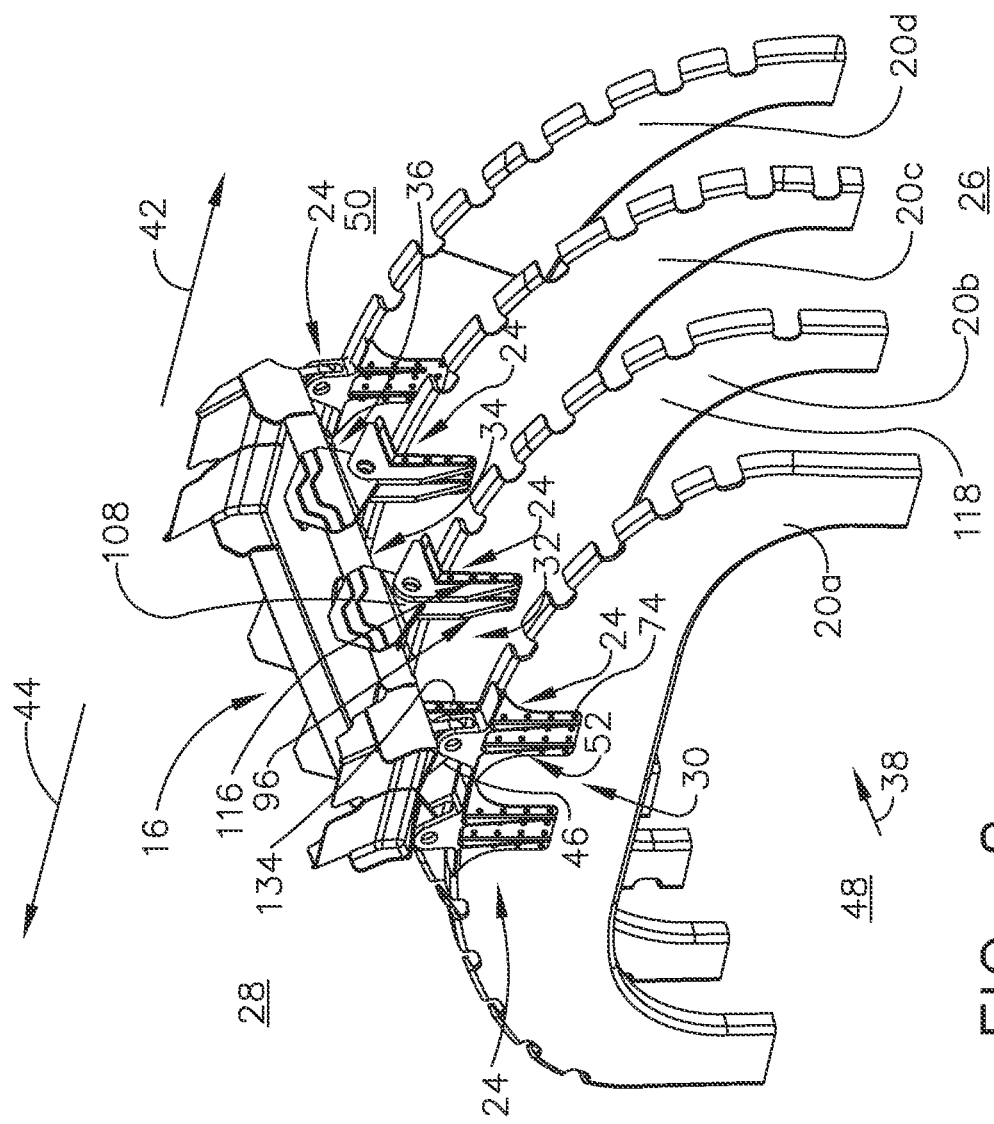
FIG. 2 is a perspective partial view, in a direction toward a forward portion of the aircraft of FIG. 1, of composite fuselage frames secured to a portion of a vertical tail assembly of the aircraft, without composite fuselage skin being shown.
Figure 3:
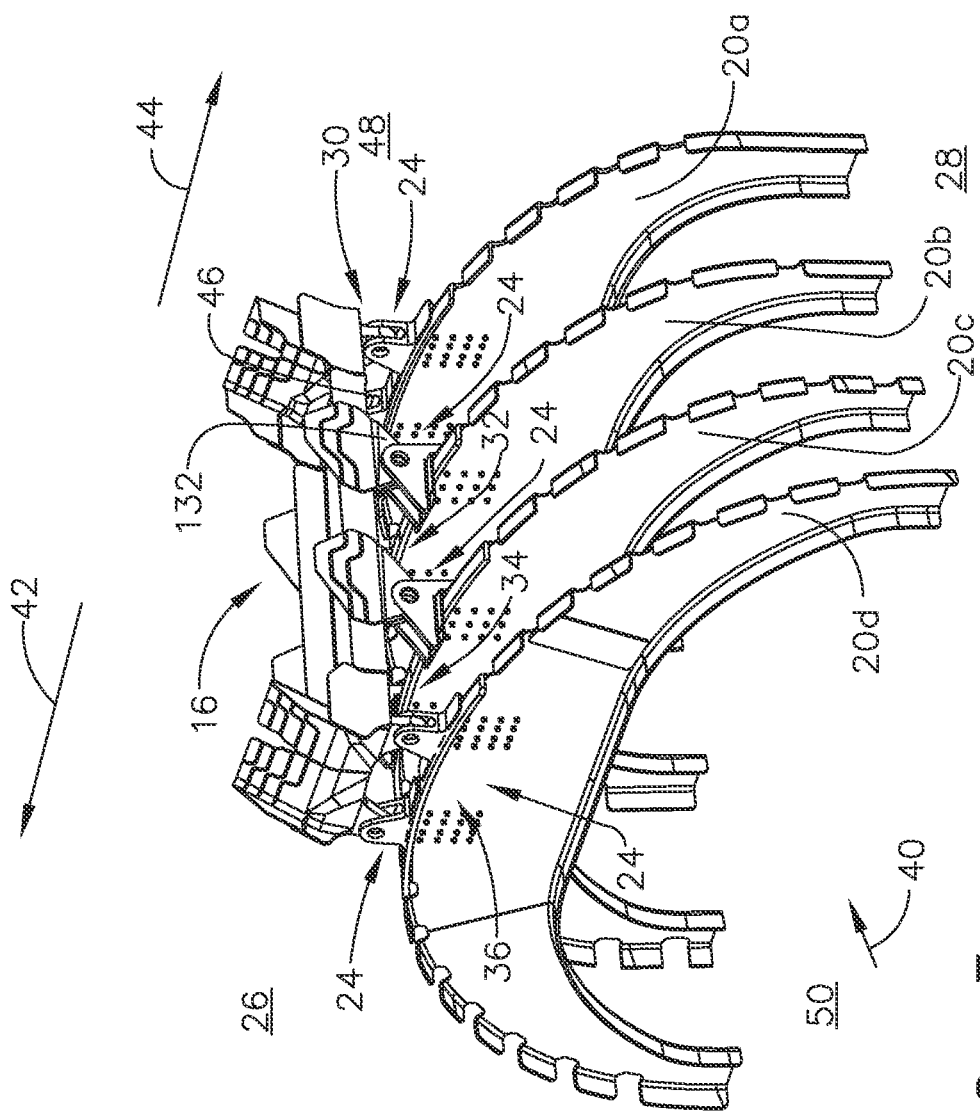
FIG. 3 is a perspective partial view, in a direction toward an aft portion of the aircraft of FIG. 1, of composite fuselage frames secured to a portion of a vertical tail assembly of the aircraft of FIG. 2.
Figure 4:
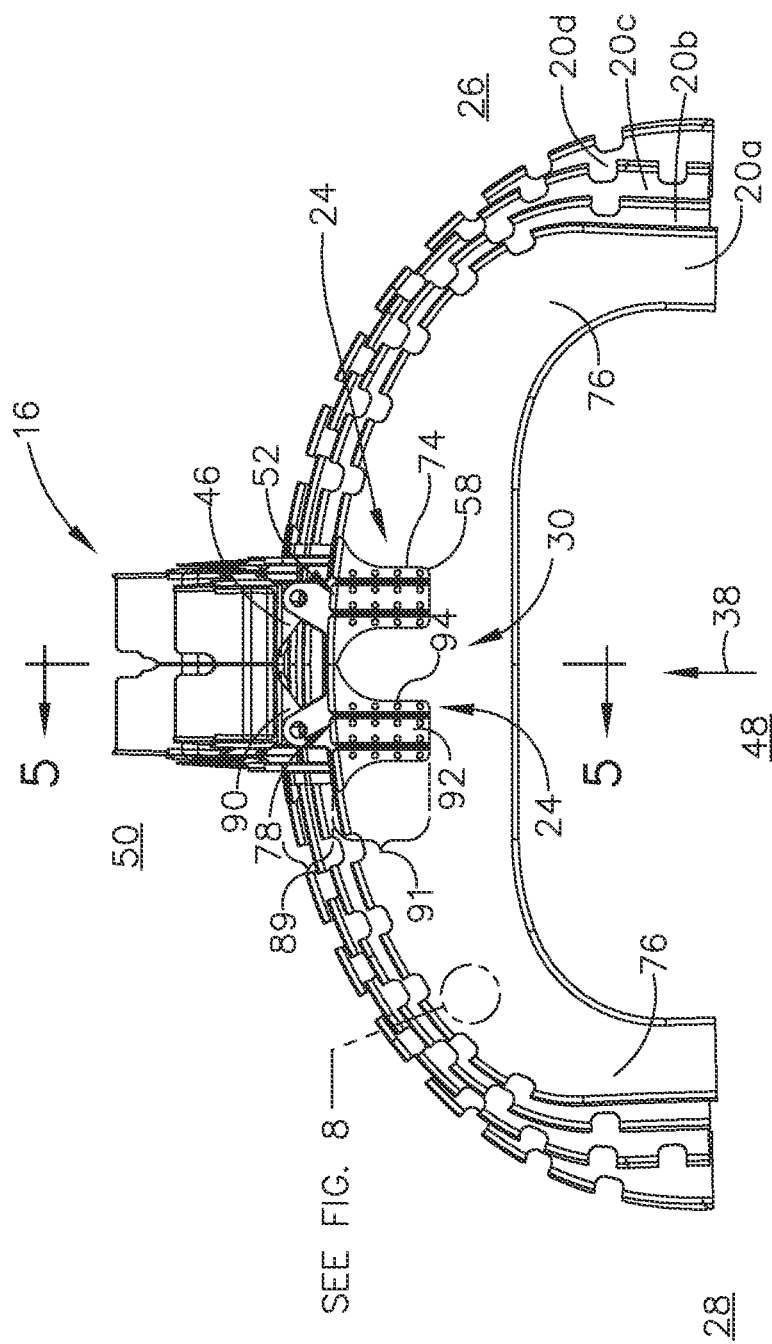
FIG. 4 is an end elevation partial view, in a direction toward the forward portion of the aircraft of FIG. 1, of the composite fuselage frames secured to a portion of the vertical tail assembly of the aircraft of FIG. 2.

In referring to FIG. 1, aircraft 10 includes fuselage assembly 12, wing assemblies 14 and vertical tail fin assembly 16. In fabrication of aircraft 10, vertical tail fin assembly 16 includes a support structure (not shown) of spars and ribs to which skin 18 of aircraft 10 secures. Vertical tail fin assembly 16 further secures to fuselage assembly 12 of aircraft 10 with being connected to fuselage frames. In construction of aircraft 10, as discussed earlier, fabricators have utilized metal, such as aluminum, to construct fuselage frames. Metallic fuselage frames were similar to the configurations of fuselage frames, such as for example, first, second, third and fourth fuselage frames, 20*a*, 20*b*, 20*c* and 20*d*, as seen in FIGS. 2-4. The number of fuselage frames to which vertical tail fin assembly 16 is secured can vary depending on the design of the particular aircraft 10.

In the present disclosure, first through fourth fuselage frames 20a-20d, are now constructed with CFRP material, instead of metal, which avoids drawbacks, as discussed earlier associated with metallic fuselage frames. With utilizing CRFP for constructing fuselage frames there is no longer a need to take corrosion resistance preventative measures with respect to a metallic fuselage frame. In addition, with a CFRP constructed fuselage frame there is no longer a need for inspections related to material fatigue with respect to the first through fourth fuselage frames 20a-20d and fuselage skin 22, with first through fourth fuselage frames 20a-20d and skin 18 of aircraft 10 both being constructed of similar CFRP materials resulting in first through fourth fuselage frames 20a-20d and skin 18 having similar thermal expansion co-efficient characteristics. Moreover, extended fabrication times of aircraft 10 are reduced with eliminating forging order delays with respect to fabrication of metallic fuselage frames being removed from the fabrication scheduling.

These drawbacks are overcome with first through fourth fuselage frames 20a-20d, in this example, and fuselage skin 22 now both being constructed of CFRP material. With the benefits provided with using CFRP material used for fuselage frames such as, 20a-20d, securement assembly 24, to be discussed herein, is needed for securing vertical tail fin assembly 16 to aircraft 10 through first through fourth fuselage frames 20a-20d of fuselage assembly 12. Securement assembly 24 provides needed transferring of shear loads from vertical tail fin assembly 16 to first through fourth fuselage frames 20a-20d, of the present example, which are constructed of CFRP material.

Securement of vertical tail fin assembly 16 to fuselage frames constructed of metal, was accomplished with bolting of vertical tail fin assembly 16 in a generally vertical direction relative to vertical tail fin assembly 16 and the metal fuselage frames. However, this configuration of securement, with respect to a fuselage frame now constructed of CFRP material, does not provide optimal shear resistance with respect to shear loadings transmitted from vertical tail fin assembly 16 to, in this example, first through fourth fuselage frames 20a-20d as a result of aircraft 10 operations. As a result, securement assembly 24, as seen in FIGS. 2-7, and described herein, provides an optimal securement of vertical tail fin assembly 16 to, in this example, first through fourth fuselage frames 20a-20d constructed of CFRP for resistance to shear loads originating from vertical tail fin assembly 16.

In the present example, of securing vertical tail fin assembly 16 to four, first through fourth, fuselage frames 20a-20d herein, each of first through fourth fuselage frames 20a-20d has a pair of securement assemblies 24 spaced apart on each of first through fourth fuselage frames 20a-20d securing vertical tail fin assembly 16 to each of first through fourth fuselage frames 20a-20d. In referring to FIG. 2 a starboard side 26 of aircraft 10 perspective view of first through fourth fuselage frames 20a-20d is seen and in FIG. 3 a port side 28 of aircraft 10 perspective view of first through fourth fuselage frames 20a-20d is seen. The two views provide a view of each pair of securement assemblies 24 with respect to each of first through fourth fuselage frames 20a-20d. First pair 30 of securement assemblies 24 are positioned on first fuselage frame 20a, second pair 32 of securement assemblies 24 are positioned on second fuselage frame 20b, third pair 34 of securement assemblies 24 are positioned on third fuselage frame 20c and fourth pair 36 of securement assemblies 24 are positioned on fourth fuselage frame 20d.

In the present example, first and fourth pairs 30 and 36 of securement assemblies 24 are configured the same and are optimal in resisting shear forces transmitted from vertical tail fin assembly 16 that have resulting shear loads in forward direction 38 and aft direction 40, such as seen in FIGS. 2 and 3. In contrast, in this example, second and third pairs 32 and 34 of securement assemblies 24 are configured the same and are optimal in resisting shear forces transmitted from vertical tail fin assembly 16 that have resulting shear loads oriented in starboard direction 42 or in port direction 44. The difference between the first pair 30 and fourth pair 36 of securement assemblies 24, on the one hand, and second pair 32 and third pair 34 of securement assemblies 24, on the other hand, is the orientation of a pin used in the securement assemblies 24 to lug members to be discussed. In first pair 30 and fourth pair 36 of securement assemblies 24 the pin, for each securement assembly 24 is positioned to extend along first fuselage frame 20a and fourth fuselage frame 20d, respectively. In second pair 32 and third pair 34 of securement assemblies 24 the pin, for each securement assembly 24 is positioned to extend transverse to second fuselage frame 20b and third fuselage frame 20c, respectively.

In the present example, first pair 30 of securement assemblies 24 is positioned on first fuselage frame 20a and second pair 32 of securement assemblies 24 is positioned on second fuselage frame 20b as seen in FIGS. 2 and 3. It should be appreciated the location of first fuselage frame 20a carrying first pair 30 of securement assemblies 24 is not restricted to being positioned as the most aft position 48 of first through fourth fuselage frames 20a-20d which secure to vertical tail fin assembly 16 and the location of fourth fuselage frame 20d carrying fourth pair 36 of securement assemblies 24 is not restricted to being positioned on the most forward position 50 of first through fourth fuselage frames 20a-20d which secure to vertical tail fin assembly 16. Similarly, second pair 32 of securement assemblies 24 is not restricted to being positioned on second fuselage frame 20b positioned between first and fourth pairs 30, 36 of securement assemblies 24, which are positioned on first and fourth fuselage frames 20a and 20d, respectively. Similarly, third pair 34 of securement assemblies 24 is not restricted to being positioned on third fuselage frame 20c positioned between the first and fourth pairs 30, 36 securement assemblies, which are positioned on first and fourth fuselage frames 20a and 20d, respectively. In the present example described herein, first and fourth pairs 30, 36 of securement assemblies 24 are positioned on first and fourth fuselage frames 20a and 20d which are positioned most aft position 48 and most forward position 50 of aircraft 10, respectively, for securing to vertical tail fin assembly 16. Second and third pairs 32, 34 are positioned on second and third fuselage frames 20b and 20c, respectively, which are positioned between first and fourth fuselage frames 20a and 20d, for securing vertical tail fin assembly 16.

Figure 5:
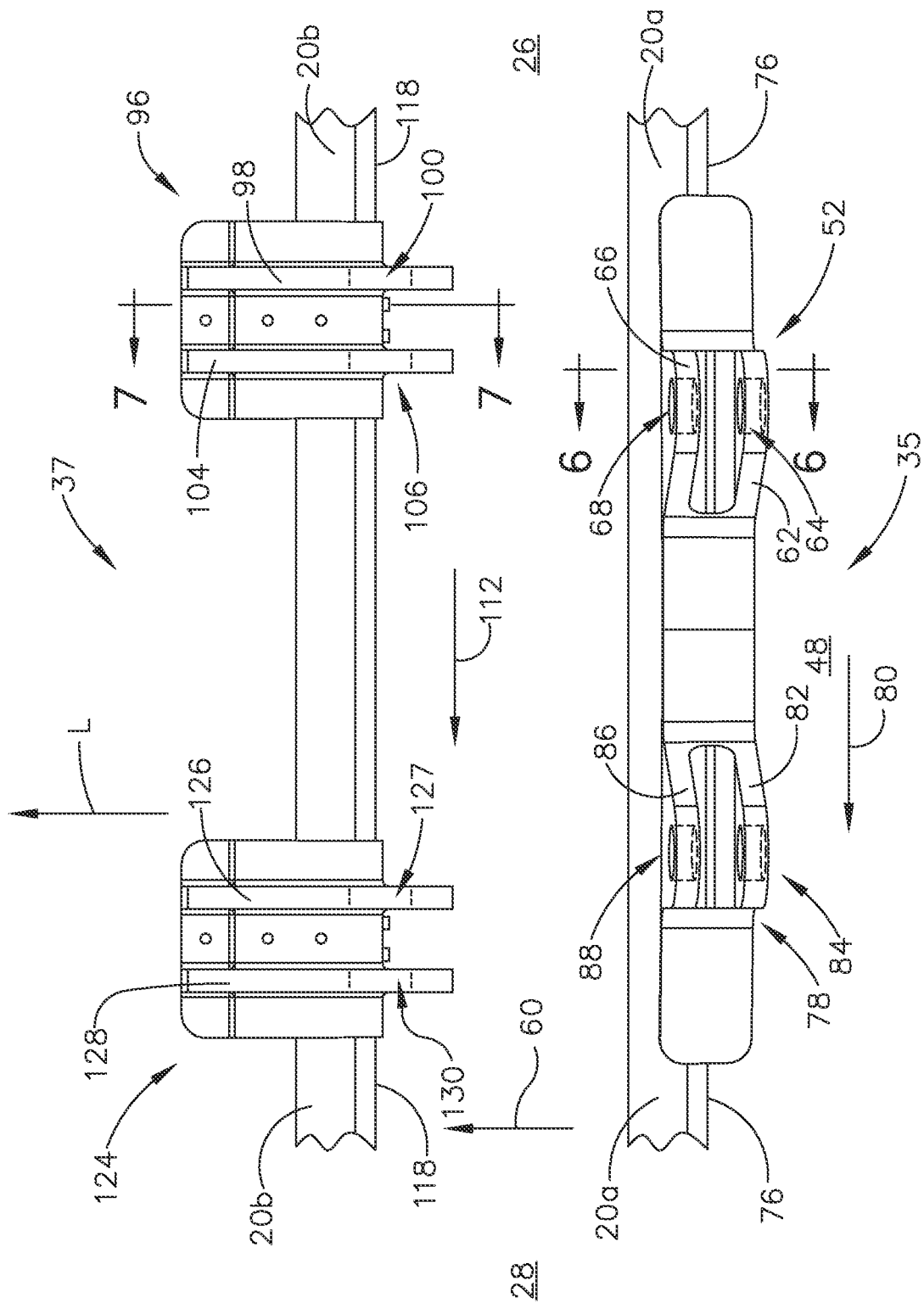
FIG. 5 is a top partial plan view of two composite fuselage frames of FIG. 2, with each fuselage frame having two clevis members positioned spaced apart from one another along each of the two composite fuselage frames without any of the vertical tail assembly or lug members present.
Figure 6:
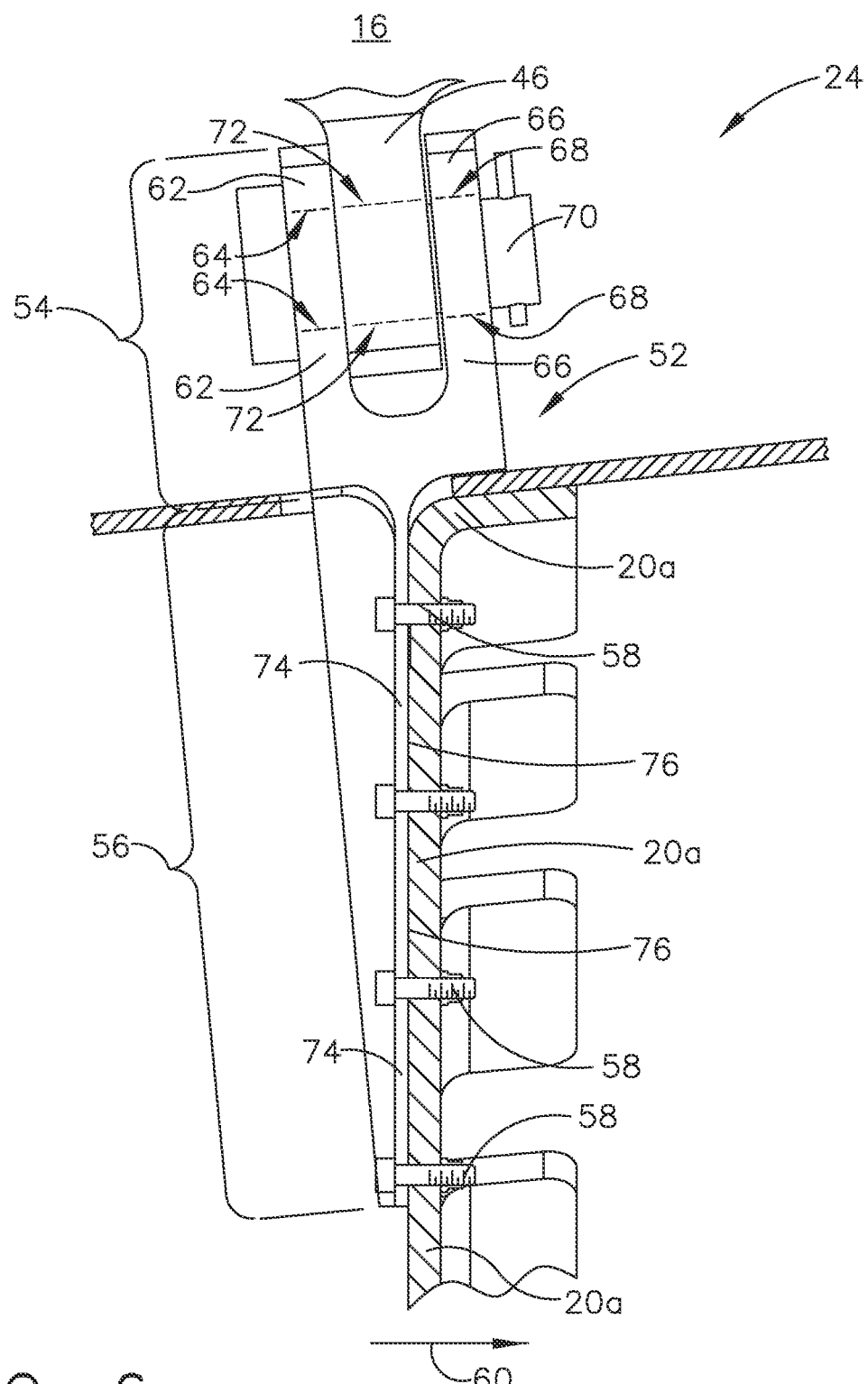
FIG. 6 is a cross section view along line 6-6 as seen in FIG. 5 including a lug member secured to a clevis member extending through composite fuselage skin.

In referring to FIGS. 2-7, securement assembly 24 for securing vertical tail fin assembly 16 to aircraft 10 by way of securing to, in this example, first through fourth fuselage frames 20a-20d, includes first lug member 46 is secured (not shown) to vertical tail fin assembly 16, such as for example bolting (not shown) first lug member 46 to a framework of spars and ribs (not shown) of vertical tail fin assembly 16. First clevis member 52, positioned on first fuselage frame 20a, has a first end portion 54 of first clevis member 52 engaged to first lug member 46, as seen in FIG. 6 and which will be discussed in further detail. First clevis member 52 further includes second end portion 56 of the first clevis member 52 which is secured to first fuselage frame 20a, which is constructed of composite material, CFRP. First fastener 58 extends through second end portion 56, as will be further discussed, and first fuselage frame 20a in first direction 60 transverse to first fuselage frame 20a. In this example, first fastener 58 includes a bolt and nut assembly.

As seen in FIG. 6, first clevis member 52 has first prong 62, which defines first opening 64 at first end portion 54 of first clevis member 52 and has second prong 66 which defines second opening 68 at first end portion 54 of first clevis member 52. First lug member 46 is positioned between first prong 62 and second prong 66 of first clevis member 52. First pin 70 extends through first opening 64 of first prong 62, second opening 68 of second prong 66 and through first lug opening 72 defined by and through first lug member 46 engaging first clevis member 52 to first lug member 46 such that first pin 70 extends in first direction 60 transverse to first fuselage frame 20a. Second end portion 56 of first clevis member 52 includes first securement flange 74 which extends along forward side 76 of first fuselage frame 20a with first fastener 58 extending through first securement flange 74 and first fuselage frame 20a. Positioning first fastener 58, as seen in FIGS. 4 and 6, extending in first direction 60 transverse to first fuselage frame 20a, first clevis member 52 is secured to first fuselage frame 20a, which is constructed of CFRP, to optimally secure first securement flange 74 to first fuselage frame 20a so as to optimally confront shear loadings being received from vertical tail fin assembly 16.

First pair 35 of clevis members, as seen in FIG. 5, includes first clevis member 52 and second clevis member 78 secured to first fuselage frame 20a wherein first clevis member 52 and second clevis member 78 are positioned spaced apart from one another in second direction 80 along first fuselage frame 20a. First clevis member 52 has first prong 62 which defines first opening 64 at first end portion 54 of first clevis member 52 and second clevis member 78 has first prong 82 which defines first opening 84 at first end portion 89, as seen in FIG. 4, of second clevis member 78 similar to that of first end portion 54 of first clevis member 52. First clevis member 52 has second prong 66 which defines second opening 68 at first end portion 54 of first clevis member 52 and second clevis member 78 has second prong 86 which defines second opening 88, as seen in FIG. 5, at first end portion 89, as shown in FIG. 4, of second clevis member 78 similar to that of first end portion 54 of first clevis member 52, as seen in FIG. 6.

First lug member 46 is positioned between first prong 62 and second prong 66 of first clevis member 52 of first pair 35 of first clevis member 52 and second clevis member 78. Second lug member 90, as seen in FIG. 4 is positioned between first prong 82 and second prong 86 of FIG. 5, of second clevis member 78 of first pair 35 of first clevis member 52 and second clevis member 78. First pin 70, as seen in FIG. 6, extends through first opening 64 of first prong 62 of first clevis member 52, second opening 68 of second prong 66 of first clevis member 52 and through first lug opening 72 defined by and through first lug member 46 such that first pin 70 extends in first direction 60 transverse to first fuselage frame 20a. Second pin (not shown) extends through first opening 84 of first prong 82 of second clevis member 78, second opening 88 of second prong 86 of second clevis member 78 and through second lug opening (not shown) defined by and through second lug member 90, as seen in FIG. 4, such that second pin (not shown) extends in first direction 60 transverse to first fuselage frame 20a. The configuration of second clevis member 78 engaged to second lug member 90 is similar as shown in FIG. 6 with respect to first clevis member 52 securing to first lug member 46.

Second end portion 56 of first clevis member 52 includes, as seen in FIG. 6, first securement flange 74 and second end portion 91 of second clevis member 78 includes second securement flange 92 as seen in FIG. 4. First securement flange 74 extends along forward side 76 of first fuselage frame 20a with first fastener 58, of FIG. 6, extending through first securement flange 74 and first fuselage frame 20a in first direction 60 transverse to first fuselage frame 20a. Second securement flange 92 extends along forward side 76 of first fuselage frame 20a with second fastener 94, as seen in FIG. 4, extending through second securement flange 92 and first fuselage frame 20a in first direction 60 transverse to first fuselage frame 20a, similar to the configuration of first securement flange 74 as seen in FIG. 6.

Figure 7:
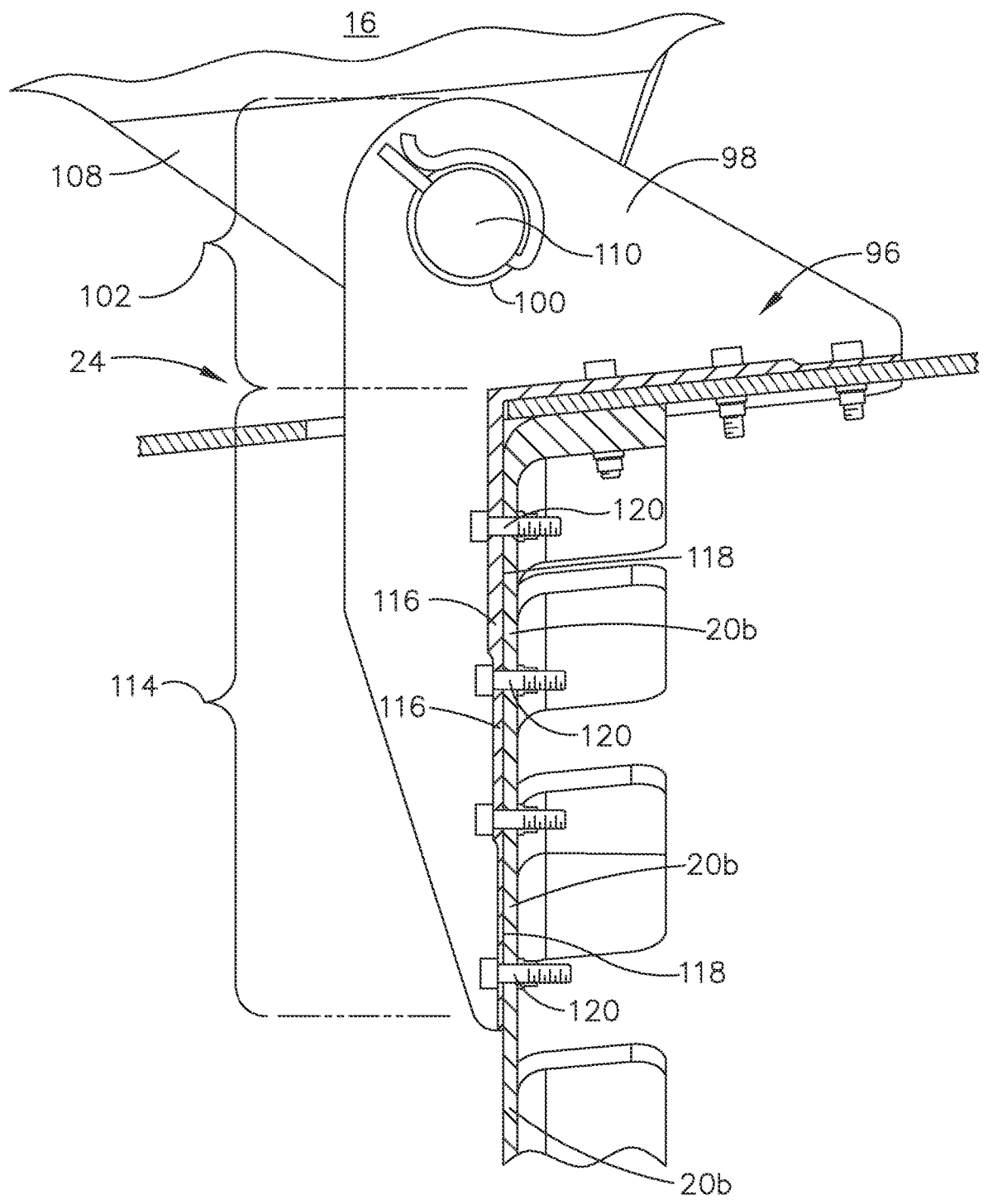
FIG. 7 is a cross section view along line 7-7 as shown in FIG. 5 including a lug member secured to a clevis member.

Third clevis member 96, as seen in FIGS. 5 and 7, is secured to, in this example, to second fuselage frame 20b, constructed of composite material, CFRP, spaced apart from first clevis member 52 along length L of aircraft 10, which has first prong 98 which defines first opening 100 at first end portion 102 of third clevis member 96 and has a second prong 104 which defines second opening 106 at first end portion 102 of third clevis member 96. Third lug member 108 is positioned between first prong 98 and second prong 104 of third clevis member 96. Third pin 110 which extends through first opening 100 of first prong 98, second opening 106 of second prong 104 of third clevis member 96 and through third lug opening (not shown) defined by and through third lug member 108 engaging third clevis member 96 to third lug member 108 such that third pin 110 extends in third direction 112, as seen in FIG. 5, along second fuselage frame 20b. Second end portion 114, as seen in FIG. 7, of third clevis member 96 includes third securement flange 116 which extends along forward side 118 of second fuselage frame 20b with third fastener 120, such as for example a bolt with a nut, extending through third securement flange 116 and second fuselage frame 20b in fourth direction 122 transverse to second fuselage frame 20b.

Further included in this example is second pair of clevis members 37, as seen in FIG. 5, including third clevis member 96, as described above, and fourth clevis member 124 secured to second fuselage frame 20b, which is also constructed of a composite material, CFRP. Third clevis member 96 and fourth clevis member 124 are positioned spaced apart from one another in third direction 112 along second fuselage frame 20b. As described above third clevis member 96 has first prong 98 which defines first opening 100 at first end portion 102 of third clevis member 96 and fourth clevis member 124 has first prong 126 which defines first opening 127 at first end portion (not shown) of fourth clevis member 124. First end portion (not shown) of fourth clevis member 124 is similar to first end portion 102 of third clevis member 96 shown in FIG. 7. Third clevis member 96, a discussed earlier and seen in FIG. 5, has second prong 104 which defines second opening 106 at first end portion 102 of third clevis member 96. Fourth clevis member 124 has second prong 128 which defines second opening 130 at first end portion (not shown) of fourth clevis member 124.

Third lug member 108 is positioned between first prong 98 and second prong 104 of third clevis member 96. Fourth lug member 132, as seen in FIG. 3, is positioned between first prong 126 and second prong 128 of fourth clevis member 124 of FIG. 5. Third pin 110, as seen in FIG. 7, extends through first opening 100 of first prong 98 of third clevis member 96, second opening 106 of second prong 104 of third clevis member 96 and through third lug opening (not shown) defined by and through third lug member 108, such that third pin 110 extends in third direction 112, as shown in FIG. 5, along second fuselage frame 20b. Fourth pin (not shown) but similar to third pin 110 as seen in FIG. 7, extends through first opening 127 of first prong 126 of fourth clevis member 124, second opening 130 of second prong 128 of fourth clevis member 124, of FIG. 5, and through a fourth lug opening (not shown) defined by and through fourth lug member 132, as seen in FIG. 3, such that fourth pin (not shown) extends in third direction 112 along second fuselage frame 20b as seen in FIG. 5.

Second end portion 114 of third clevis member 96, as seen in FIG. 7, includes third securement flange 116 and second end portion (not shown) of fourth clevis member 124 includes fourth securement flange 134, as seen in FIG. 2. Second end portion (not shown) of fourth clevis member 124 and fourth securement flange 134 are similar to second end portion 114 of third clevis member 96 and third securement flange 116 as shown in FIG. 7. Third securement flange 116 extends along forward side 118, as seen in FIGS. 2 and 7, of second fuselage frame 20b with third fastener 120 extending through third securement flange 116 and second fuselage frame 20b in fourth direction 122 transverse to second fuselage frame 20b. Fourth securement flange 134, as seen in FIG. 2, extends along forward side 118 of second fuselage frame 20b with fourth fastener (not shown) however similar to that of third fastener 120 of FIG. 7 extending through the fourth securement flange 134 and second fuselage frame 20b in fourth direction 122 transverse to second fuselage frame 20b, similar to third securement flange 116 securement arrangement as seen in FIG. 7.

First through fourth fuselage frames 20a-20d, in this example, are constructed with composite material such as CFRP. In the present example, the composite material has a five ply configuration for each layer of composite material used in constructing first through fourth fuselage frames 20a-20d, wherein in this example multiple layers of composite material are used. In referring to FIG. 8 one ply has a nonlinear fiber configuration 136 of fibers. In constructing each layer of composite material, one ply of composite material contains the nonlinear fiber configuration 136 of fibers which includes twenty percent (20%) of the plies for that layer. In this example, nonlinear fiber configuration 136 of fibers extend in a curved direction having a radial axis R. Two plies of composite material have a first linear fiber configuration of fibers 138 which extend within an angular range which includes plus or minus five degrees of plus thirty degrees of being angularly displaced from radial axis R. The angular displacement is represented as angle "A". Two plies of composite material have first linear fiber configuration of fibers 138 which includes about forty percent (40%) of the plies for that layer. Another two plies of composite material for the layer includes a second linear fiber configuration of fibers 140 which extend within an angular range which includes plus or minus five degrees of minus thirty degrees of being angularly displaced from radial axis R. The angular displacement is represented as angle "B". This example of fiber configuration in the composite material provides a construction that is lighter in weight than a metal counterpart fuselage frame and provides required resistance to shear loads originating from vertical tail fin assembly 16 as a result of aircraft 10 operations.

Figure 9:
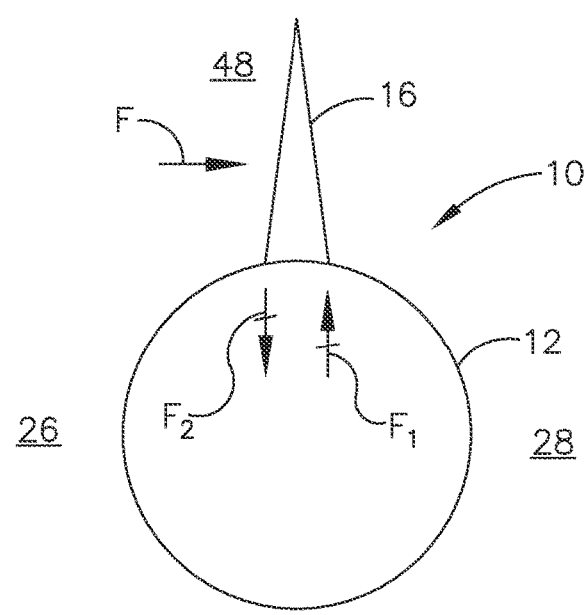
FIG. 9 is a schematic cross section view of a fuselage and vertical tail fin assembly of the aircraft of FIG. 1 showing reactive forces experienced by securement assemblies which secure fuselage frames to vertical tail fin assembly of aircraft with the application of a lateral force applied to the vertical tail fin assembly.

In referring to FIG. 9, a schematic cross section of aircraft 10 is shown with fuselage assembly 12 and vertical tail fin assembly 16 in viewing toward aft position 48 of aircraft 10. An example of reactant shear force with respect to first through fourth fuselage frames 20a-20d during operation of aircraft 10 is shown. In operation of aircraft 10, an aerodynamic operational force F can be applied, as in this example, from starboard side 26 of aircraft 10. The aerodynamic operational force F resultant force load is transmitted through vertical tail fin assembly 16 such that fuselage frames such as 20a-20d provide reactant forces of F1 in a direction toward vertical tail fin assembly 16 on port side 28 of vertical tail fin assembly 16 of aircraft 10 and of F2 in a direction away from vertical tail fin assembly 16 on starboard side 26 of vertical tail fin assembly 16 of aircraft 10 in countering aerodynamic operational force F. With aerodynamic operational force F reversed in direction reactant forces F1 and F2 are reversed in direction. In the example of securement assemblies 24 described herein, second and third pairs 32 and 34 of securement assemblies 24 positioned on fuselage frames 20b and 20c, respectively, provide optimal load transfers between fuselage frames 20b and 20c in addressing the aerodynamic operational force F experienced from starboard or port sides 26, 28 of aircraft 10. First and fourth pairs 30 and 36 of securement assemblies 24 positioned on fuselage frames 20a and 20d, respectively, provide optimal load transfers between fuselage frames 20a and 20d and vertical tail fin assembly 16 in addressing longitudinal operational forces on vertical tail fin assembly 16 along length L of aircraft 10.

Figure 10:
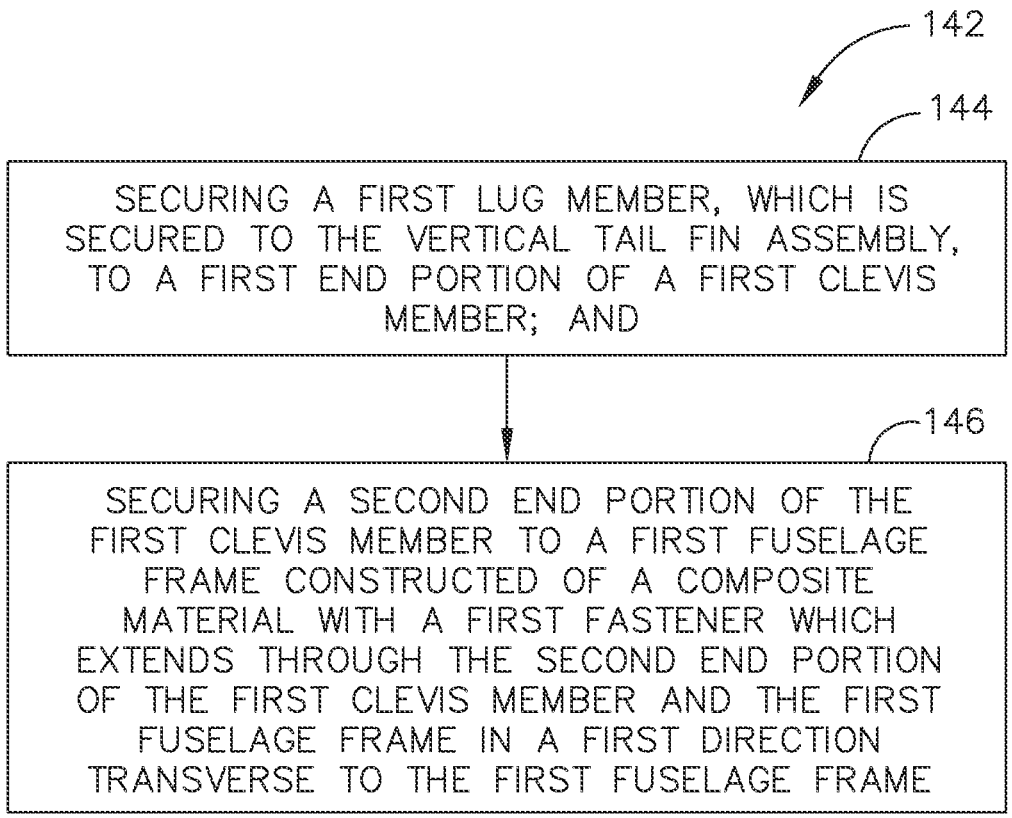
FIG. 10 is a flow chart of a method for securing a vertical tail fin assembly to an aircraft.

In referring to FIG. 10, method 142 for securing vertical tail fin assembly 16 to aircraft 10 includes securing 144 first lug member 46, which is secured to vertical tail fin assembly 16, to first end portion 54 of first clevis member 52. Method 142 further includes securing 146 second end portion 56 of first clevis member 52 to first fuselage frame 20a constructed of composite material with first fastener 58 which extends through second end portion 56 of first clevis member 52 and first fuselage frame 20a in first direction 60 transverse to first fuselage frame 20a.

Securing 144 of first lug member 46 to first end portion 54 of first clevis member 52 includes first clevis member 52 having first prong 62 which defines first opening 64 at first end portion 54 of first clevis member 52 and has second prong 66 which defines second opening 68 at first end portion 54 of first clevis member 52, as seen in FIG. 5. First lug member 46 is positioned between first prong 62 and second prong 66 of first clevis member 52 and defines first lug opening 72 through first lug member 46, as seen in FIG. 6. First pin 70 extends through first opening 64 of first prong 62, second opening 68 of second prong 66 and through first lug opening 72 of first lug member 46, such that first pin 70 extends in first direction 60 transverse to first fuselage frame 20a.

Method 142 for securing further includes first pair 35 of clevis members including first clevis member 52 and second clevis member 78, as seen in FIG. 5, wherein second clevis member 78 is secured to first fuselage frame 20a spaced apart from first clevis member 52 in second direction 80 along first fuselage frame 20a. Second pin (not shown) extends through first opening 84 of first prong 82 of first portion of the second clevis member 78, second opening 88 of second prong 86 of first end portion 89 of second clevis member 78 and through second lug opening (not shown) of second lug member 90, such that second pin (not shown) extends in first direction 60 transverse to first fuselage frame 20a. Second fastener 94 extends through second end portion 91, as seen in FIG. 4, of second clevis member 78 and through first fuselage frame 20a in first direction 60 transverse to first fuselage frame 20a securing second clevis member 78 to first fuselage frame 20a.

Method 142 further includes securing of third lug member 108, as seen in FIG. 7, to first end portion 102 of third clevis member 96 with third securement flange 116 of a second end portion 114 of the third clevis member 96 secured to second fuselage frame 20b, which is spaced apart from first fuselage frame 20a. Third clevis member 96 includes first prong 98 which defines first opening 100 at first end portion 102 of third clevis member 96 and has second prong 104 which defines second opening 106 at first end portion 102 of third clevis member 96, as seen in FIG. 5. Third lug member 108 is positioned between first prong 98 and second prong 104 of third clevis member 96 and defines third lug opening (not shown) through third lug member 108. Third pin 110 extends through first opening 100 of first prong 98, second opening 106 of second prong 104 and through third lug opening (not shown) of third lug member 108, such that third pin 110 extends in third direction 112 along second fuselage frame 20b. Third fastener 120 extends through third securement flange 116 of second end portion 114 of third clevis member 96 and second fuselage frame 20b in fourth direction 122 transverse to second fuselage frame 20b, as seen in FIG. 7.

Second pair of clevis members 37 including third clevis member 96 and fourth clevis member 124, as seen in FIG. 5, wherein fourth clevis member 124 is secured to second fuselage frame 20b spaced apart from third clevis member 96 in third direction 112 along second fuselage frame 20b. Fourth clevis member 124 has first prong 126 which defines first opening 127 at first end portion (not shown) of fourth clevis member 124 and has second prong 128 which defines second opening 130 at first end portion (not shown) of fourth clevis member 124. First end portion (not shown) of fourth clevis member 124 is similar to first end portion 102 of third clevis member 96 shown in FIG. 7. Fourth lug member 132, as seen in FIG. 3, is positioned between first prong 126 and second prong 128 of fourth clevis member 124 and defines fourth lug opening (not shown) through fourth lug member 132. Fourth pin (not shown), similar to third pin 110 as seen in FIG. 7, extends through first opening 127 of first prong 126, second opening 130 of second prong 128 and through fourth lug opening (not shown) of the fourth lug member 132, such that the fourth pin (not shown) extends in third direction 112 along second fuselage frame 20b. Fourth fastener (not shown), similar to that of third fastener 120 of FIG. 7, extends through fourth securement flange 134, as seen in FIG. 2, of second end portion (not shown) of fourth clevis member 124 and second fuselage frame 20b in fourth direction 122 transverse to second fuselage frame 20b, similar to third securement flange 116 securement arrangement as seen in FIG. 7.

Figure 8:
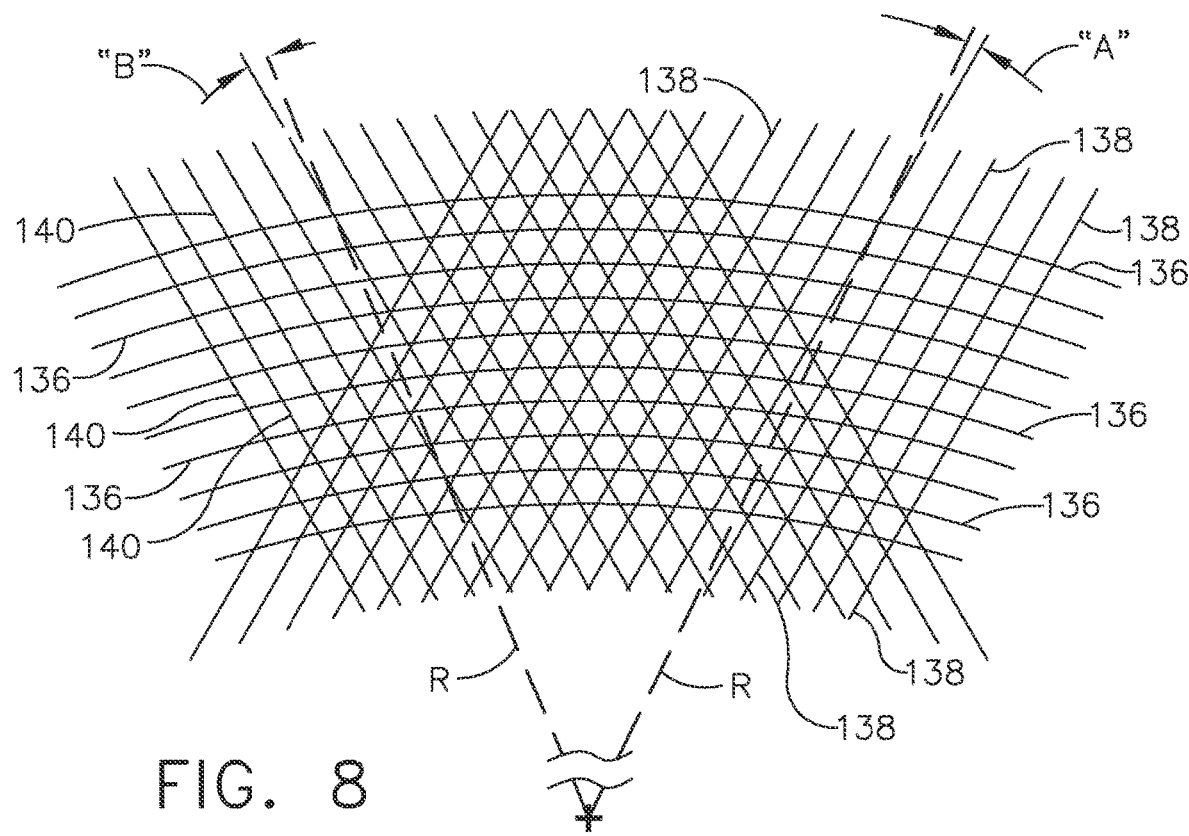
FIG. 8 is a schematic view of a fiber arrangement within the composite material of fuselage frame as representatively seen at location of circle identified with see FIG. 8 in FIG. 4.

The composite material used in construction of first through fourth fuselage frames 20a-20d include five ply configurations for a layer, wherein multiple layers are employed in this example, as described earlier, which includes one ply having a nonlinear fiber configuration 136 of fibers, as seen in FIG. 8. Two plies have a first linear fiber configuration of fibers 138 which extends within an angular range which includes plus or minus five degrees of plus thirty degrees of angular displacement from radial axis R of nonlinear fiber configuration 136 of fibers. Another two plies have a second linear fiber configuration of fibers 140 which extends within an angular range which includes plus or minus five degrees of minus thirty degrees of angular displacement from radial axis R of nonlinear fiber configuration 136 of fibers.

While various embodiments have been described above, this disclosure is not intended to be limited thereto. Variations can be made to the disclosed embodiments that are still within the scope of the appended claims.

What is claimed:

1. A securement assembly for securing a vertical tail fin assembly to an aircraft, comprising:
   a first lug member secured to the vertical tail fin assembly; and
   a first clevis member, wherein:
      a first end portion of the first clevis member is engaged to the first lug member; and
      a second end portion of the first clevis member is secured to a first fuselage frame, wherein the first fuselage frame is constructed of a composite material, wherein the second end portion of the first clevis member overlaps part of the first fuselage frame in which a first fastener extends through the second end portion of the first clevis member and the first fuselage frame in a first direction transverse to the first fuselage frame, wherein the composite material comprises a five-ply configuration which includes:
         one ply having a nonlinear fiber configuration;
         two plies having a first linear fiber configuration which extends within an angular range which includes plus or minus five degrees of plus thirty degrees of angular displacement from a radial axis of the nonlinear fiber configuration; and
         another two plies having a second linear fiber configuration which extends within an angular range which includes plus or minus five degrees of minus thirty degrees of angular displacement from the radial axis of the nonlinear fiber configuration.

2. The securement assembly of claim 1, wherein the first end portion of the first clevis member defines a first opening along a first clevis axis in which a first pin extends through the first opening of the first clevis member and the first lug member to secure together the first clevis member and the first lug member, the securement assembly further comprising:
   a second lug member secured to the vertical tail fin assembly; and
   a second clevis member, wherein:
      a first end portion of the second clevis member is engaged to the second lug member, wherein the first end portion of the second clevis member defines a second opening along a second clevis axis in which a second pin extends through the second opening of the second clevis member and the second lug member to secure together the second clevis member and the second lug member, wherein the first pin and the second pin are spaced apart; and
      a second end portion of the second clevis member is secured to a second fuselage frame, wherein the second fuselage frame is constructed of the composite material, wherein the second end portion of the second clevis member overlaps part of the second fuselage frame in which a second fastener extends through the second end portion of the second clevis member and the second fuselage frame in the first direction transverse to the second fuselage frame.

3. The securement assembly of claim 2, wherein:
   the first opening of the first clevis member is further defined as a plurality of first openings;
   the first clevis member has a first prong which defines one of the plurality of first openings at the first end portion of the first clevis member and has a second prong which defines another one of the plurality of first openings at the first end portion of the first clevis member; and the first lug member is positioned between the first prong and the second prong of the first clevis member.

4. The securement assembly of claim 3, wherein the first pin extends through the first opening of the first prong, the first opening of the second prong and through a first lug opening defined by and through the first lug member engaging the first clevis member to the first lug member such that the first pin extends generally in the first direction transverse to the first fuselage frame.

5. The securement assembly of claim 3, wherein the second end portion of the first clevis member comprises a first securement flange which extends along a forward side of the first fuselage frame with the first fastener extending through the first securement flange and the first fuselage frame.

6. The securement assembly of claim 2, wherein the first clevis member includes a first clevis portion and a second clevis portion, wherein the first opening of the first clevis member is further defined as a plurality of first openings.

7. The securement assembly of claim 6, wherein the first pin includes a plurality of first pins.

8. The securement assembly of claim 6, wherein:
the second end portion of the first clevis portion comprises a first securement flange and the second end portion of the second clevis portion comprises a second securement flange;
the first securement flange extends along a forward side of the first fuselage frame; and
the second securement flange extends along the forward side of the first fuselage frame.

9. The securement assembly of claim 2, wherein:
the second opening of the second clevis member is further defined as a plurality of second openings;
the second clevis member is spaced apart from the first clevis member along a length of the aircraft;
the second clevis member has a first prong which defines one of the plurality of second openings at the first end portion of the second clevis member and has a second prong which defines another one of the plurality of second openings at the first end portion of the second clevis member; and
the second lug member is positioned between the first prong and the second prong of the second clevis member.

10. The securement assembly of claim 9, wherein the second pin extends through the second opening of the first prong of the second clevis member, the second opening of the second prong of the second clevis member and through a second lug opening defined by and through the second lug member engaging the second clevis member to the second lug member such that the second pin extends in a different direction than the first pin.

11. The securement assembly of claim 9, wherein the second end portion of the second clevis member comprises a third securement flange which extends along a forward side of the second fuselage frame with the second fastener extending through the third securement flange and the second fuselage frame in a direction transverse to the second fuselage frame.

12. The securement assembly of claim 9, wherein the second clevis member includes a third clevis portion and a fourth clevis portion secured to the second fuselage frame positioned spaced apart from one another in a third direction along the second fuselage frame.

13. The securement assembly of claim 12, wherein:
the third clevis portion has a first prong at a first end portion of the third clevis portion;
the third clevis portion has a second prong at the first end portion of the third clevis portion;
the fourth clevis portion has a first prong at a first end portion of the fourth clevis portion; and
the fourth clevis portion has a second prong at the first end portion of the fourth clevis portion.

14. The securement assembly of claim 13, wherein the second pin includes a plurality of second pins.

15. The securement assembly of claim 13, wherein:
a second end portion of the third clevis portion comprises a third securement flange and a second end portion of the fourth clevis portion comprises a fourth securement flange.

16. A method for securing a vertical tail fin assembly to an aircraft, comprising:
securing a first lug member, which is secured to the vertical tail fin assembly, to a first end portion of a first clevis member; and
securing a second end portion of the first clevis member to a first fuselage frame, wherein the first fuselage frame is constructed of a composite material, wherein the second end portion of the first clevis member overlaps part of the first fuselage frame in which a first fastener extends through the second end portion of the first clevis member and the first fuselage frame in a first direction transverse to the first fuselage frame,
wherein the composite material comprises multiple groups of a five-ply configuration which includes:
one ply having a nonlinear fiber configuration;
two plies having a first linear fiber configuration which extends within an angular range which includes plus or minus five degrees of plus thirty degrees of angular displacement from a radial axis of the nonlinear fiber configuration; and
another two plies having a second linear fiber configuration which extends within an angular range which includes plus or minus five degrees of minus thirty degrees of angular displacement from the radial axis of the nonlinear fiber configuration.

17. The method for securing of claim 16, wherein the first lug member is secured to the first end portion of the first clevis member via a first pin, wherein the first end portion of the first clevis member defines a first opening along a first clevis axis in which the first pin extends through the first opening of the first clevis member and the first lug member to secure together the first clevis member and the first lug member,
wherein the method further comprises:
securing a second lug member, which is secured to the vertical tail fin assembly, to a first end portion of a second clevis member via a second pin, wherein the first end portion of the second clevis member defines a second opening along a second clevis axis in which the second pin extends through the second opening of the second clevis member and the second lug member to secure together the second clevis member and the second lug member, wherein the first clevis axis and the second clevis axis are spaced apart;
securing a second end portion of the second clevis member to a second fuselage frame, wherein the second fuselage frame is constructed of the composite material, wherein the second end portion of the second clevis member overlaps part of the second fuselage frame in which a second fastener extends through the second end portion of the second clevis member and the second fuselage frame in the first direction transverse to the second fuselage frame;

securing a third lug member, which is secured to the vertical tail fin assembly, to a first end portion of a third clevis member via a third pin, wherein the first end portion of the third clevis member defines a third opening along a third clevis axis in which the third pin extends through the third opening of the third clevis member and the third lug member to secure together the third clevis member and the third lug member, wherein the second clevis axis and the third clevis axis are spaced apart and substantially parallel to each other;

securing a second end portion of the third clevis member to a third fuselage frame, wherein the third fuselage frame is constructed of the composite material, wherein the second end portion of the third clevis member overlaps part of the third fuselage frame in which a third fastener extends through the second end portion of the third clevis member and the third fuselage frame in the first direction transverse to the third fuselage frame;

securing a fourth lug member, which is secured to the vertical tail fin assembly, to a first end portion of a fourth clevis member via a fourth pin, wherein the first end portion of the fourth clevis member defines a fourth opening along a fourth clevis axis in which the fourth pin extends through the fourth opening of the fourth clevis member and the fourth lug member to secure together the fourth clevis member and the fourth lug member, wherein the first clevis axis and the fourth clevis axis spaced apart and substantially parallel to each other; and securing a second end portion of the fourth clevis member to a fourth fuselage frame, wherein the fourth fuselage frame is constructed of the composite material, wherein the second end portion of the fourth clevis member overlaps part of the fourth fuselage frame in which a fourth fastener extends through the second end portion of the fourth clevis member and the fourth fuselage frame in the first direction transverse to the fourth fuselage frame.

18. A securement assembly for securing a vertical tail fin assembly to an aircraft, comprising:
a first lug member secured to the vertical tail fin assembly; and
a first clevis member, wherein:
  a first end portion of the first clevis member is engaged to the first lug member; and
  a second end portion of the first clevis member is secured to a first fuselage frame, wherein the first fuselage frame is constructed of a composite material, wherein the composite material comprises:
  one ply having a nonlinear fiber configuration;
  two plies having a first linear fiber configuration which extends within an angular range which includes plus or minus five degrees of plus thirty degrees of angular displacement from a radial axis of the nonlinear fiber configuration; and
  another two plies having a second linear fiber configuration which extends within an angular range which includes plus or minus five degrees of minus thirty degrees of angular displacement from the radial axis of the nonlinear fiber configuration.

19. The securement assembly of claim 18, wherein the first end portion of the first clevis member defines a first opening along a first clevis axis in which a first pin extends through the first opening of the first clevis member and the first lug member to secure together the first clevis member and the first lug member, wherein the securement assembly further comprises:
a second lug member secured to the vertical tail fin assembly;
a second clevis member, wherein:
  a first end portion of the second clevis member is engaged to the second lug member, wherein the first end portion of the second clevis member defines a second opening along a second clevis axis in which a second pin extends through the second opening of the second clevis member and the second lug member to secure together the second clevis member and the second lug member; and
  a second end portion of the second clevis member is secured to a second fuselage frame, wherein the second end portion of the second clevis member overlaps part of the second fuselage frame in which a second fastener extends through the second end portion of the second clevis member and the second fuselage frame in a first direction transverse to the second fuselage frame;
a third lug member secured to the vertical tail fin assembly;
a third clevis member, wherein:
  a first end portion of the third clevis member is engaged to the third lug member, wherein the first end portion of the third clevis member defines a third opening along a third clevis axis in which a third pin extends through the third opening of the third clevis member and the third lug member to secure together the third clevis member and the third lug member; and
  a second end portion of the third clevis member is secured to a third fuselage frame, wherein the second end portion of the third clevis member overlaps part of the third fuselage frame in which a third fastener extends through the second end portion of the third clevis member and the third fuselage frame in the first direction transverse to the third fuselage frame;
a fourth lug member secured to the vertical tail fin assembly;
a fourth clevis member, wherein:
  a first end portion of the fourth clevis member is engaged to the fourth lug member, wherein the first end portion of the fourth clevis member defines a fourth opening along a fourth clevis axis in which a fourth pin extends through the fourth opening of the fourth clevis member and the fourth lug member to secure together the fourth clevis member and the fourth lug member; and
  a second end portion of the fourth clevis member is secured to a fourth fuselage frame, wherein the second end portion of the fourth clevis member overlaps part of the fourth fuselage frame in which a fourth fastener extends through the second end portion of the fourth clevis member and the fourth fuselage frame in the first direction transverse to the fourth fuselage frame, and wherein
the first pin and the fourth pin are spaced apart and orientated in the same direction relative to each other; and
the second pin and the third pin are spaced apart and orientated in the same direction relative to each other.

20. The securement assembly of claim 19, wherein the first clevis axis and the fourth clevis axis are concentric to each other.

* * * * *